United States Patent

Pruett et al.

[11] Patent Number: 5,870,555
[45] Date of Patent: Feb. 9, 1999

[54] LAN RESOURCE MANAGER

[75] Inventors: Paul S. Pruett, Columbia; Joel R. Jensen; Alan F. Rosenhauer, both of Franklin, all of Tenn.

[73] Assignee: Electronic Data Systems Corporation, Plano, Tex.

[21] Appl. No.: 652,222

[22] Filed: May 23, 1996

[51] Int. Cl.$^6$ .............................. G06F 15/16; G06F 13/14
[52] U.S. Cl. ................. 395/200.53; 395/183.19; 395/184.01
[58] Field of Search ............... 395/200.03, 685, 395/200.15, 208, 200.09, 909, 613, 183.19, 184.01, 327, 200.61, 200.57, 200.47, 200.52, 200.32, 828, 700.6, 108.01, 389, 200.68, 500.176, 200.54, 200.25, 200.45; 364/400, 403, DIG. 1, DIG. 2; 455/69, 54.2; 706/10; 345/339; 707/4, 1, 3; 705/8

[56] References Cited

U.S. PATENT DOCUMENTS

| | | | |
|---|---|---|---|
| 5,276,444 | 1/1994 | McNair | 340/825.33 |
| 5,297,031 | 3/1994 | Gutterman et al. | 364/408 |
| 5,434,775 | 7/1995 | Sims | 364/403 |
| 5,491,797 | 2/1996 | Thompson et al. | 395/200.03 |
| 5,499,340 | 3/1996 | Barritz | 395/184.01 |
| 5,682,549 | 10/1997 | Tanaka et al. | 395/828 |

Primary Examiner—Daniel H. Pan
Attorney, Agent, or Firm—Kevin J. Meek; L. Joy Griebenow

[57] ABSTRACT

A system (24, 44, 52) for compiling and reporting network information to a user of a network (10) comprises a user interface (32) for receiving a network information request from the user. An automated information compiler (44) receives the network information request from the user interface (32) and compiles network information in response to the network information request. A report generator (34) receives the compiled network information from the information compiler (44) and generates a report in response to the compiled network information.

22 Claims, 3 Drawing Sheets

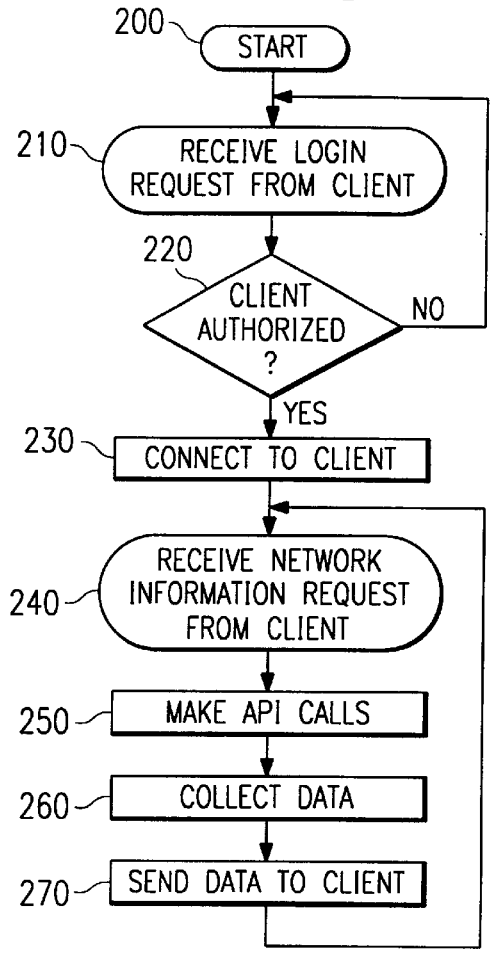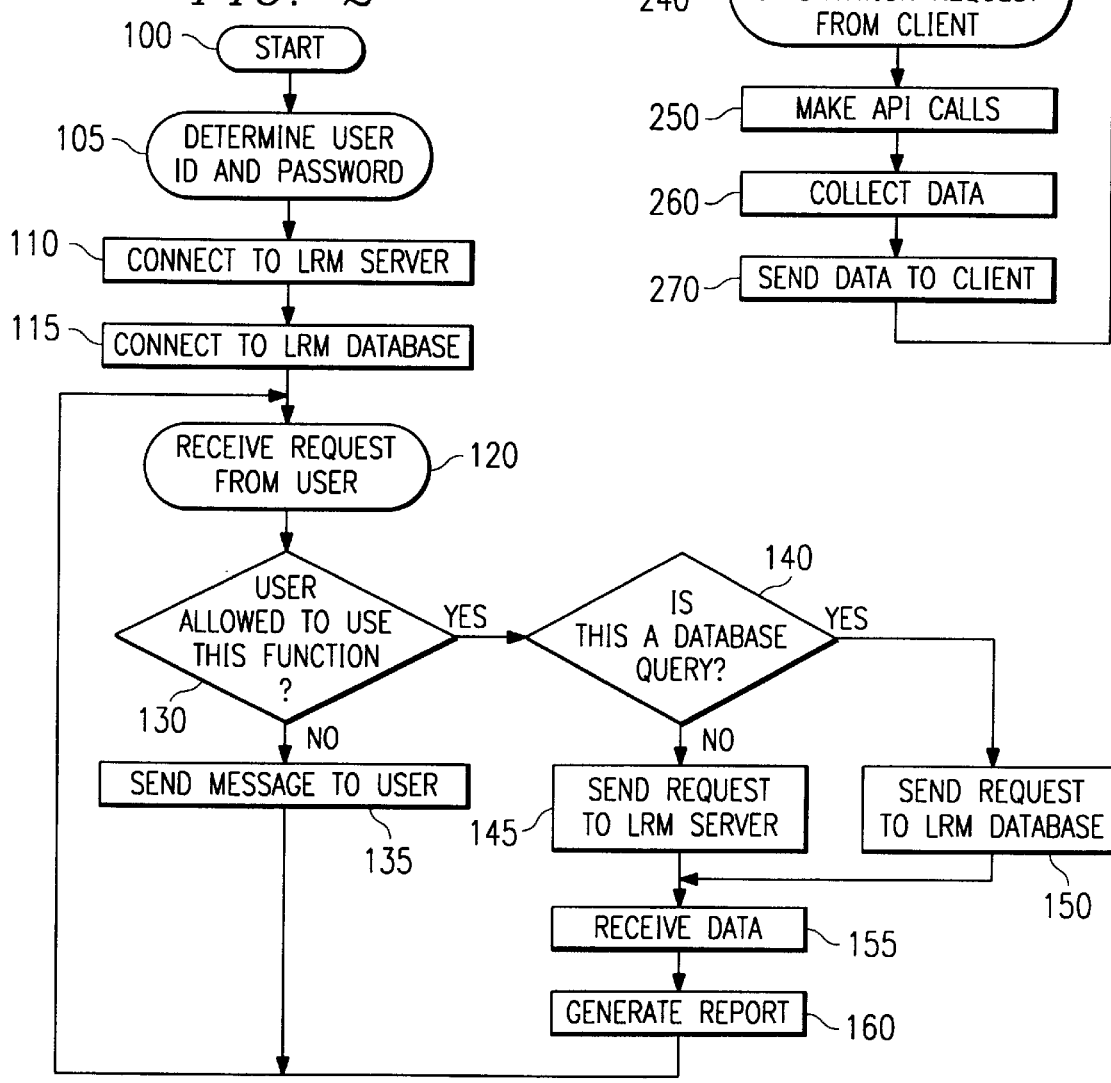

LAN RESOURCE MANAGER

TECHNICAL FIELD OF THE INVENTION

This invention relates generally to computer systems and more particularly to a method and system for compiling and reporting computer network information.

BACKGROUND OF THE INVENTION

A computer network is formed by coupling computers to a communication medium. The computers may be coupled to the communication medium in many well-known ways, which are typically referred to as "network architectures." The communications medium may be referred to in terms of the amount of data that it can transfer in a given period of time. For example, a network communications medium may be capable of transferring ten megabytes of digital data per second.

The size of a network is to some extent limited by the size and capacity of the communications medium. For example, a high-speed bus may be limited to a length of several hundred meters, while long distance telephone lines may be used to transmit data at lower speeds over transcontinental distances. A local area network (LAN) usually refers to a network that includes a high-speed communications medium with a relatively short length, and a wide-area network (WAN) usually refers to two or more LANs that are coupled to each other through "gateways" that are coupled to lower speed data lines.

Computers coupled to the network may be referred to as client computers and server computers. A client computer, typically referred to simply as a client, may be a personal computer (PC), a "laptop" computer, a workstation, a terminal, or any other type of computational resource. A client may be used exclusively by a single user or group of users.

A server computer, typically referred to simply as a server, may also be a PC, but in larger networks is often a specially designed piece of equipment that includes a microprocessor. Servers are typically designed for use by multiple clients over the network. For example, servers may be used to provide printing services to one or more clients on the network. The services provided by such servers, known as print servers, may include queuing data files that have been sent for printing, supplying the files to a printer or printers connected to the server, routing data files to other printers or servers if the intended printer becomes unavailable, and other print services.

In addition to print servers, there may also be file servers that store files that are transmitted over the network, mail servers that provide electronic mail services to users of the network, and other servers providing other services. In general, servers are used to perform shared specialized services and to increase the accessibility of data and peripherals on the network.

In a business or work environment, users of a network are often assigned to groups for purposes of network administration. Under existing network architectures, network group assignments are typically maintained on a network security database by a network administrator, and are used to control access to network resources. A user's network group assignments are typically based on work group alliances within the business.

A network group will not necessarily include all of the users involved in a particular business unit or division, or a group may include more than one business unit. For example, if a work project includes members from several business units, then a network group may include all of these members. Those working on the project, particularly at a management or supervisory level, may wish to gather network information about the project members who are also in their business unit, such as the total disk space used by each of the members.

However, the degree of access which a user has to network information is generally determined by the user's status in relation to administration of the network itself, rather than the user's status within a particular work project or business unit. Therefore, a project manager may only have user-level access to network information, and may not be able to collect detailed network information about other project participants. Even with greater access to network information, the information could only be gathered by making a series of file server inquiries to a plurality of file servers. This is a highly inefficient manner in which to gather information.

SUMMARY OF THE INVENTION

Therefore, a need has arisen for a method and system for assigning computer network users to a primary or functional group in addition to the other, often overlapping network groups to which they belong. A need has also arisen for a method and system for assigning different levels of access to network information to users in a functional group. Furthermore, a need has arisen for a method and system for compiling and reporting network information to a user of the network.

Accordingly a method and system for compiling and reporting network information to a network user are provided that substantially eliminate or reduce disadvantages associated with prior systems and methods.

In accordance with one embodiment, a system for compiling and reporting network information to a user of a network comprises a user interface for receiving a network information request from the user. An automated information compiler receives the network information request from the user interface and compiles network information in response to the network information request. A report generator receives the compiled network information from the information compiler and generates a report in response to the compiled network information.

In accordance with another aspect of the invention, the information compiler includes an assigned network information access level independent of an access level assigned to the user. The information compiler compiles network information within the assigned network information access level in response to the network information request. More specifically, the network information compiled by the information compiler may include network information outside the access level assigned to the user.

A technical advantage of the present invention is that an improved method and system for obtaining network information are provided. Another technical advantage of the present invention is that the system for compiling and reporting network information allows a user broader access to network information than the user's assigned access level may allow. Another technical advantage of the present invention is that the system for compiling and reporting network information allows the creation of functional groups which may be used to define ownership of network resources.

BRIEF DESCRIPTION OF THE DRAWINGS

For a better understanding of the present invention, reference may be made to the accompanying drawings, in which:

FIGS. 2 through 5 are flow charts illustrating one embodiment of a process compiling and reporting computer network information.

DETAILED DESCRIPTION OF THE INVENTION

Figure 1:
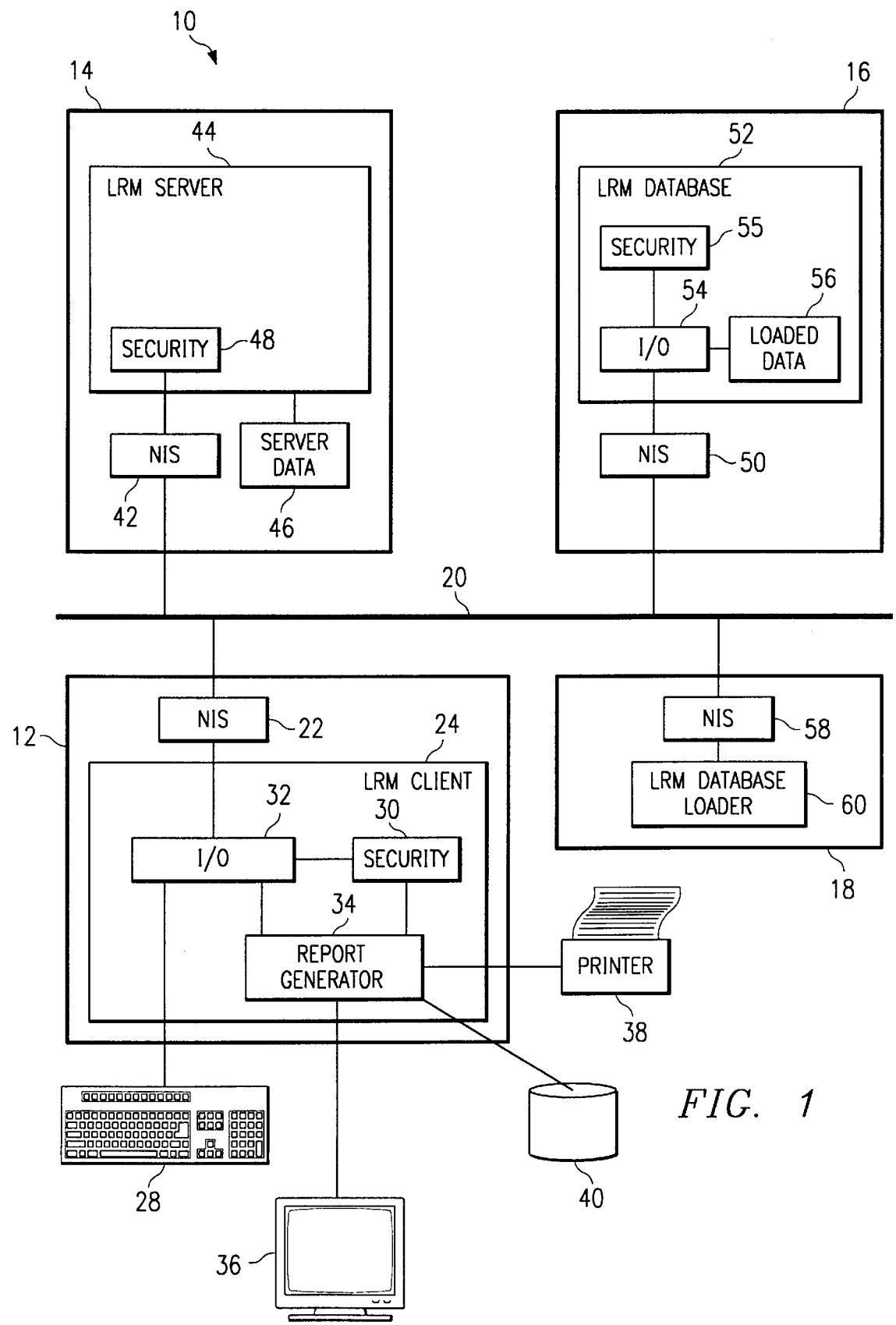
FIG. 1 is a block diagram of an exemplary computer network constructed in accordance with the invention.

FIG. 1 illustrates an exemplary client-server network 10 constructed in accordance with the invention. Network 10 may include a local area network (LAN) or wide area network (WAN) or combination thereof. Network 10 comprises a client 12 and a plurality of servers 14, 16, and 18, connected to a network data bus 20. Network 10 may also comprise a network security database (not shown) which maintains a list of user IDs and network groups. The network security database may also categorize users according to their status in relation to network administration. For example, a few users may be assigned administrator-level access to network information and network administration functions, while most users will be assigned user-level access, which is much more limited in scope.

Client 12 comprises a network interface system (NIS) 22 connected to network data bus 20, for communicating with network 10. Client 12 also comprises a LAN resource manager (LRM) client system 24, which may comprise, for example, a computer program executed in a Windows™ operating environment by one or more microprocessors.

LRM client system 24 includes an input/output (I/O) system 32 for receiving and interpreting a network information request entered by a user of client 12 via keyboard 28 or other input device. LRM client system 24 also includes a security system 30 for receiving the network information request from I/O system 32, and for determining whether the user making the request has authority to do so.

As will be explained more fully below, LRM server system 44 may have greater access to network information than the network security database or other security system normally allows for users. Therefore, to restrict access to network information, some screening of network information requests is necessary. This screening is accomplished by security system 30 in a manner to be described in connection with FIG. 2.

I/O system 32 maintains a connection with servers 14 and 16, receives network information requests from security system 30, determines whether a network information request should be routed to server 14 or server 16, routes the network information request to the appropriate server, receives a response from the appropriate server, and routes the response to a report generator system 34. Report generator system 34 organizes the data received from I/O system 32 into a report format, and sends the report to a monitor 36, a printer 38, a storage device 40 such as a hard disk drive, or other suitable output device.

Server 14 comprises a network interface system 42, an LRM server system 44 and a server data block 46. Network interface system 42 maintains communication between LRM server system 44 and network data bus 20. LRM server system 44, which acts as an automated information compiler, may comprise, for example, a detached job running under a network account with administrator-level access. This gives LRM server system 44 access to information which would not be available to a user of network 10 with user-level access. LRM server system 44 may comprise, for example, a Microsoft Windows NT™ Open Data Services process, such as an SQL server. Persons skilled in the art will recognize that LRM server system 44 may comprise a detached job running on server 14 or any client or server in network 10.

LRM server system 44 includes a security system 48 for receiving a connection request from client 12 or another network client, and for determining whether the client requesting a connection is authorized for such a connection. Security system 48 therefore provides a second layer of security, allowing only authorized clients to connect to LRM server system 44, while security system 30 restricts the requests which will be passed along to LRM server system 44 by client 12 once a connection is made.

LRM server system 44 is operable to receive a network information request from client 12 or any other network client, and to translate the network information request into a series of data requests, which are sent to server data block 46. LRM server system 44 is also operable to receive data from server data block 46 in response to the data requests, and to compile and send the data received to client 12.

Server 16 comprises a network interface system 50 and an LRM database system 52. Network interface system 50 maintains communication between LRM database system 52 and network data bus 20. LRM database system 52 may comprise, for example, an SQL server. Like LRM server system 44, LRM database system 52 may comprise a process running on server 16 or any other server or client in network 10.

LRM database system 52 includes an I/O system 54, which receives a network information request from client 12, consults a security system 55 to determine whether the client is authorized to connect to LRM database system 52, and accesses a loaded data block 56 in response to the network information request. I/O system 54 compiles the data received from loaded data block 56 and sends the compiled data to client 12.

LRM database system 52 is operable to store information about network groups, functional groups, and user accounts. For example, as will be explained more fully below, LRM database system 52 is operable to maintain a current membership list for each functional group. Security system 55 also maintains a list of "owners" for each functional group. An owner of a functional group may be permitted to view any data stored in loaded data block 56 which pertains to the functional group. An owner may also be allowed to change the membership of the functional group, or eliminate the group altogether. A non-owner member of a functional group may be given more restricted access to the data in loaded data block 56. These functional group definitions and access levels are independent of network group definitions and access levels maintained on a network security database (not shown).

Server 18 comprises a network interface system 58 and an LRM database loader system 60. LRM database loader system 60 is operable to automatically and periodically send out information requests to a network security database (not shown) or to any other servers or clients in network 10. LRM database loader system 60 is also operable to receive information from servers and clients in response to the information requests, for compiling the information, and for sending that information to loaded data block 56 of LRM database system 52.

Referring to FIG. 2, the process or method performed by LRM client system 24 is shown. This process begins at step 100 when LRM client system 24 is initialized. The process proceeds to state 105, where LRM client system 24 determines the user identification and password of the user who is currently logged in to network 10 through client 12.

When a valid user identification has been determined, the process proceeds to step 110, where LRM client system 24 establishes a connection with an LRM server system in network 10, for example LRM server system 44. If more than one LRM server system is in operation in network 10, then LRM client system 24 will establish a connection with the nearest LRM server system in network 10, in this case LRM server system 44. Alternatively, if the nearest LRM server system is unavailable, LRM client system 24 will establish a connection with the first LRM server system to respond to its login request. The method then proceeds to step 115, where LRM client system 24 establishes a connection with LRM database system 52.

Proceeding to input state 120, LRM client system 24 waits to receive input representing a network information request from the user. The input may be a selection from a menu or a character string input by the user via keyboard 28. When such a request has been received, the method proceeds to decisional step 130, where security system 30 receives the network information request from I/O system 32 and determines whether the user identified at step 105 is authorized to make the general type of request which was received. This step may involve the comparison of a set of flags determining which requests the user is allowed to make with the type of request being made. If the user is not allowed to make this type of request, the method proceeds to step 135, where report generator system 34 notifies the user that the network information request was denied. The method then returns to input state 120, where LRM client system 24 waits to receive another network information request from the user.

Examples of the types of requests which are recognized by LRM client system 24 include requests for reports of users currently logged on to LRM server system 44, all valid users of network 10, all physical and logical drive connections recognized by LRM server system 44, the file permissions of a specified file or group of files, all recognized network groups, the members of a specified network group, all files and subdirectories within a specified directory, all available information for a specified file, including file size, date-time stamp and file permissions, all file servers on network 10, and other information reports and summaries.

Returning to decisional step 130, if security system 30 determines that the user is allowed to make the type of request that has been entered, the method proceeds to decisional step 140, where I/O system 32 determines whether the request is of the type which is more efficiently handled by LRM database system 52. If so, then the method proceeds to step 150, where I/O system 32 sends the network information request to LRM database system 52. The types of requests which can be routed to LRM database system 52 will be described more fully below, in connection with FIGS. 4 and 5. The method then proceeds to step 155.

Returning to decisional step 140, if I/O system 32 determines that the network information request is not one which should be sent to LRM database system 52, then the method proceeds to step 145, where I/O system 32 sends the network information request to LRM server system 44. Proceeding to step 155, I/O system 32 waits to receive a response to the network information request from either LRM server system 44 or LRM database system 52.

When the data has been received, the method proceeds to step 160, where I/O system 32 routes the received data to report generator system 34, which generates a report based on the received data and sends the report to an output device as requested by the user. The method then returns to state 120, where LRM client system 24 waits to receive another network information request from the user.

Referring to FIG. 3, the process or method performed by LRM server system 44 is shown. The method begins at step 200 and proceeds to login state 210, where LRM server system 44 waits to receive a login request from client 12 or another client in communication with network 10. When a login request has been received, the method proceeds to decisional step 220, where security system 48 of LRM server system 44 determines whether the client initiating the login request is authorized to do so. This step may involve the comparison of client and/or user information received in connection with the login request with a list of authorized clients or users. If the client is not authorized to connect to LRM server system 44, the method returns to state 210, where LRM server system 44 waits to receive another login request from client 12 or another client in communication with network 10. In addition, if it is determined that the client is not authorized to connect to LRM server system 44, LRM server system 44 may send a message to client 12 indicating that the client is not authorized.

Returning to decisional step 220, if the client is authorized to connect to LRM server system 44, the method proceeds to step 230, where a connection is established with the client making the request, which may be, for example, client 12. The method then proceeds to input state 240, where LRM server system 44 waits to receive a network information request from client 12.

When a network information request has been received, the method proceeds to step 250, where LRM server system 44 breaks down the network information request into a set of discrete network queries, which may comprise, for example, standard application program interface (API) calls supported by the Windows NT™ operating system. These queries may be made to server data system 46, to a network security database (not shown), or to any server or client in communication with network 10.

The method then proceeds to step 260, where LRM server system 44 receives data in response to the queries made in step 250. Proceeding to step 270, LRM server system 44 sends the data received in step 260 to client 12. LRM server system 44 then returns to input state 240, where it waits to receive another network information request from client 12.

Figure 4:
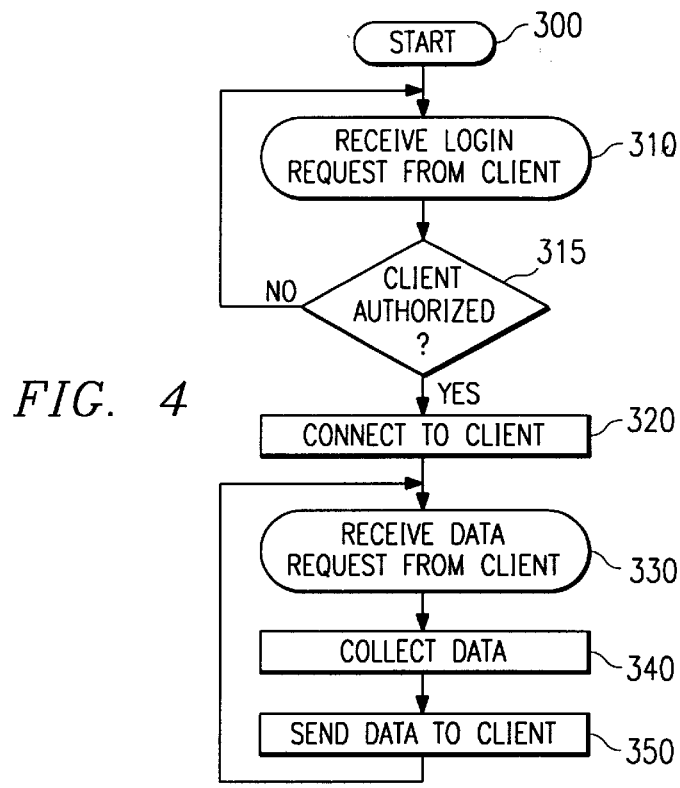

Referring to FIG. 4, the method or process performed by LRM database system 52 is shown. The method begins at step 300 and proceeds to login state 310, where LRM database system 52 waits to receive a login request from a client in communication with network 10. When a login request is received, for example from client 12, the method proceeds to step 315, where security system 55 determines whether the client initiating the login request is authorized to do so. As in step 220 shown in FIG. 3, this step may involve the comparison of client and/or user information received in connection with the login request with a list of authorized clients or users.

If the client is not authorized to connect to LRM database system 52, the method returns to state 310, where LRM database system 52 waits to receive another login request from client 12 or another client in communication with network 10. In addition, if it is determined that the client is not authorized to connect to LRM database system 52, LRM database system 52 may send a message to client 12 indicating that the client is not authorized. If it is determined that the client is authorized to connect to LRM database system 52, the method proceeds to step 320, where I/O system 54, which acts as a database interface system, establishes a connection with client 12.

Then, in input state 330, LRM database system 52 waits to receive a network information request from client 12.

When a network information request is received, the method proceeds to step 340, where LRM database system 52 interprets the request and collects the appropriate data from loaded data block 56. The method then proceeds to step 350, where I/O system 54 sends the collected data to client 12. Next, in input state 330, LRM database system 52 waits to receive another network information request from client 12, or from another client with which it has established a connection.

The types of information stored within loaded data block 56 include current functional group memberships. A functional group may comprise a plurality of network users in a business unit. Functional groups are defined and maintained solely by LRM database system 52. As a result, functional groups may be added or deleted, and functional group owners may be modified, through LRM database system 52.

LRM database system 52 may also store information concerning "ownership" of network resources by functional groups. For example, a functional group may "own" a file directory, logical drive, or entire mass storage device on a file server. The "ownership" designation can be useful, for example, in allocating network costs and expenses, and for billing functional groups according to their respective consumption of network resources. This ownership designation is distinct from the designation of certain users as "owners" of their respective functional groups, the latter designation being primarily used to control access to information about the functional groups.

Other information which may be stored within loaded data block 56 includes lists of all user accounts, network groups, network group memberships, and any other network information which is comprehensive in nature and therefore would be inefficient and time-consuming to compile every time a user requests the information. Some of this information could be obtained in many instances from a network security database. However, by carrying pre-loaded and periodically updated information in loaded data block 52, LRM database system 52 provides an alternative, faster and more efficient source of information for LRM client system 24.

Figure 5:
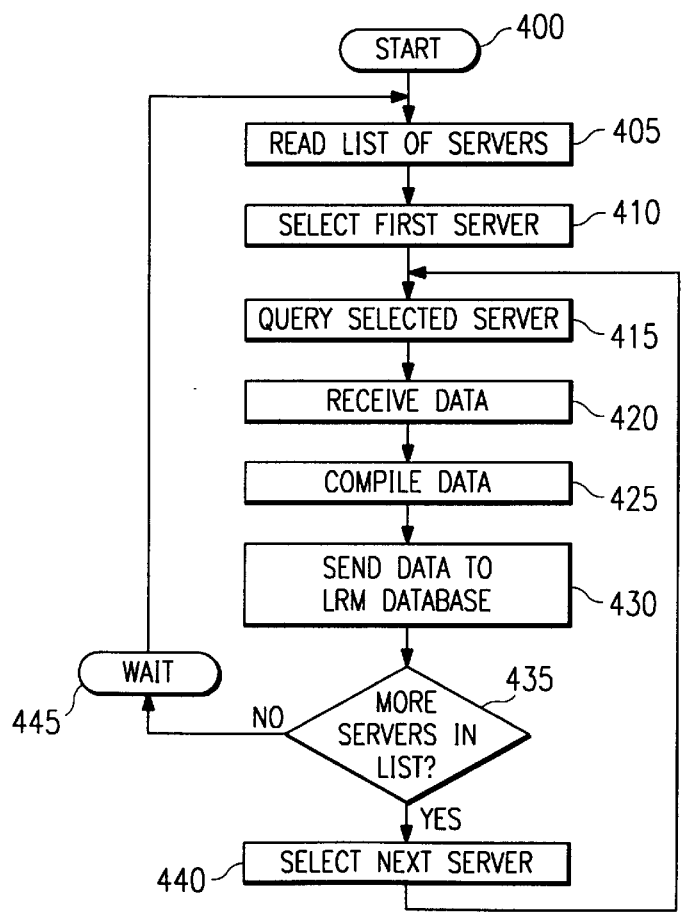

Referring to FIG. 5, the method followed by LRM database loader system 60 is shown. The method begins at step 400 and proceeds to step 405, where LRM database loader system 60 reads a list of servers, clients, or databases with information about network 10. This information may include, for example, network group memberships or user account information stored at a network security database (not shown). Proceeding to step 410, LRM database loader system 60 selects the first server in the list.

Next, in step 415, LRM database loader system 60 queries the selected server to gather data of the type stored in loaded data block 56 of LRM database system 52. For example, network group membership lists may be updated to reflect recent additions to or deletions from the membership lists. To gather this type of information, LRM database loader system 60 may only have to query one server in network 10, since each server typically carries this information.

As another example, user account information, such as a user's last logon date or the amount of disk space consumed by the user can be compiled by LRM database loader system 60. This type of information typically requires the compilation of information from all or many of the servers in network 10, because each user may have last logged on through any of the servers, and different users will primarily use disk space at different "home" servers.

Proceeding to step 420, LRM database loader system 60 waits to receive data from the selected server in response to its query. When the data has been received it is compiled at step 425 into lists and other summary forms which are useful for loaded data block 56 of LRM database system 52. The information is then sent to LRM database system 52 at step 430.

LRM database loader system 60 then determines in step 435 whether there are servers remaining in the list which have not yet been queried. If so then the method proceeds to step 440, where the next server in the list is selected. Then, in step 415, the selected server is queried.

When all servers in the list have been queried the method proceeds to wait state 445, where LRM database loader system 60 waits a predetermined period of time before repeating its update of loaded data block 56. The amount of time spent at wait state 445 may be chosen to suit the needs of the users of network 10. For example, the pause at wait state 445 may be twelve hours, resulting in an update of loaded data block 56 twice each day.

While the invention has been particularly shown and described by the foregoing detailed description, it will be understood by those skilled in the art that various other changes in form and detail may be made without departing from the spirit and scope of the invention which is solely defined by the appended claims. In particular, it will be understood by those skilled in the art that, while reference has been made to particular network configurations and operating systems and environments, such as Windows95™ and Windows NT™, the principles of the invention can be applied more generally to other types of computer network systems.

What is claimed is:

1. A system for compiling and reporting network management information to a user of a network, comprising:

a user interface operable to receive a request for network management information from the user, the network management information comprising data associated with capacity, organization or use of the network;

an automated information compiler operable to receive the request for network management information from the user interface, and operable to compile network management information in response to the request for network management information; and a report generator operable to receive the compiled network management information from the information compiler, and operable to generate a report in response to the compiled network management information.

2. The system of claim 1 and further comprising a security system operable to determine whether the user is authorized to make the request for network management information.

3. The system of claim 1 and further comprising an output device operable to receive the report from the report generator.

4. The system of claim 1 and further comprising:

a database interface system operable to receive the request for network management information from the user interface and compile data from a pre-loaded data block in response to the request for network management information; and wherein the report generator is operable to receive the compiled data from the database interface system and to generate a report in response to the compiled data.

5. The system of claim 4 and further comprising a database loader system operable to gather data from the network and store the gathered data in the pre-loaded data block.

6. The system of claim 4 wherein the pre-loaded data block comprises network user group membership data.

7. The system of claim 4 wherein the pre-loaded data block comprises user account information.

8. The system of claim 4 and further comprising an input/output system operable to select one of the information compiler and the database interface system in response to the request for network management information, and to transmit the request for network management information to the selected one of the information compiler and the database interface system.

9. A method for compiling and reporting network management information to a user of a network, comprising the steps of:

receiving a request for network management information from the user, the network management information comprising data associated with capacity, organization or use of the network;

compiling network management information with an automated information compiler in response to the request for network management information; and generating a report in response to the compiled network management information.

10. The method of claim 9 and further comprising the steps of:

compiling data with a database interface system from a pre-loaded data block in response to the request for network management information; and generating a report in response to the compiled data.

11. The method of claim 10 wherein the step of compiling data from the pre-loaded data block further comprises compiling network user group membership data from the pre-loaded data block.

12. The method of claim 10 wherein the step of compiling data from the pre-loaded data block further comprises compiling user account information from the pre-loaded data block.

13. The method of claim 9 and further comprising:

determining whether the user is authorized to make the request for network management information.

14. The method of claim 9 and further comprising:

receiving the report at an output device.

15. The method of claim 10 and further comprising:

gathering data from the network; and storing the gathered data in the pre-loaded data block.

16. The method of claim 10 and further comprising:

selecting one of the information compiler and the database interface system in response to the request for network management information; and transmitting the request for network management information to the selected one of the information compiler and the database interface system.

17. A system for compiling and reporting network management information to a user of a network, comprising:

a user interface operable to receive a request for network management information from the user, the network management information comprising data associated with capacity, organization or use of the network;

an automated information compiler operable to receive the request for network management information from the user interface, the information compiler having an assigned network management information access level independent of an access level assigned to the user, the information compiler operative to compile network management information within the assigned network management information access level in response to the request for network management information.

18. The system of claim 17 wherein the network management information compiled by the information compiler includes network management information outside the access level assigned to the user.

19. The system of claim 17 wherein the access level assigned to the user is more restrictive than the assigned network information access level of the information compiler.

20. The method of claim 17 and further comprising a report generator operable to receive the compiled network management information from the information compiler and generate a report in response to the compiled network management information.

21. The system of claim 20 wherein the user interface is operable to receive the report from the report generator and to display the report.

22. The system of claim 20 and further comprising:

a database interface system operable to receive the request for network management information from the user interface, compiling data from a pre-loaded data block in response to the request for network management information; and wherein the report generator system is operable to receive the compiled data from the database interface system and to generate a report in response to the compiled data.

* * * * *